Patented Sept. 8, 1936

2,053,337

UNITED STATES PATENT OFFICE 2,053,337

METHOD OF DEWAXING PETROLEUM STOCK

Leo D. Jones, Philadelphia, Pa., assignor to The Sharples Specialty Company, Philadelphia, Pa., a corporation of Delaware No Drawing. Application February 27, 1935, Serial No. 8,483

10 Claims. (Cl. 196—19)

The present invention is a continuation in part of application Serial No. 720,073, filed April 11, 1934, and relates to the art of removing wax from wax-containing mineral oil stock, such as residues, distillates and solvent extracted stocks and its object has been to provide a solvent adapted to effect the selective separation of oil from wax more thoroughly under economical conditions of operation than has been possible in the practice of the prior art. To this end the invention comprises the discovery of a new selective solvent adapted for use in connection with dewaxing operations, such solvent being cheap to produce and presenting the advantages of a more complete removal of wax from oil and a smaller loss of oil in the wax than can be attained by the use of solvents heretofore commercially applied for this purpose.

The invention consists in the discovery that certain compounds believed to be dichlor butanes possess important advantages when used in the extraction of wax from oil. For example, a compound having the empirical formula of $C_4H_8Cl_2$ is especially useful in this connection and can be used in the separation of both crystalline, amorphous and intermediate waxes from oil, the physical operation of removing the wax from the stock being accomplished by selective solution of the liquid hydrocarbon with wax particles suspended therein and removal of the wax particles from the solution by centrifuging, filter pressing or settling. The compound thus given as an example is apparently 1,3 dichlor, 2 methyl propane and has the following characteristics:

Boiling point _____ 136° C. at 760 mm. pressure
Specific gr _____ 1.1375 at 15.5° C.
Ref. index _____ 1.4492 at 20° C.

The newly discovered solvents of the present invention may be used in connection with the removal of wax by any of the known methods. The production of a suspension of the wax to be removed in a solution of the oil in the dewaxing solvent of the invention is preferably accomplished in the conventional manner by dissolving the stock to be dewaxed in the dewaxing solvent at a temperature sufficiently high to effect solution of substantially all of the stock in the solvent and thereafter chilling the solution so formed to effect precipitation of wax therefrom. This wax is thereafter removed by a method appropriate to its character; i. e., either by centrifuging, filter pressing or settling.

In the practice of any process for removing wax from oil, it is naturally desirable that a large portion of the wax contained in the oil be removed therefrom in order to produce an oil having a low pour point. It is also desirable that loss of oil by entrainment thereof in the wax be avoided as completely as possible, that a wax contaminated with a minimum amount of oil be obtained and that the avoidance of precipitation and separation with wax of oil ingredients of high viscosity index be avoided. While these three factors are intimately co-related, and cannot be considered entirely independently of each other, it has been found that a more desirable co-ordination of results can be attained by the use of the present dewaxing solvent than is possible by the use of any dewaxing solvent of the prior art.

The dewaxing solvent of the present invention has the additional advantage of having a comparatively low vapor pressure, although its boiling point is sufficiently low to enable it to be effectively removed from the petroleum stock after completion of the dewaxing operations.

The following example illustrates the practice of the invention:

A Mid Continent distillate of the following specifications was dewaxed in accordance with the invention:

Gravity _____ 23.8° A. P. I.
Flash _____ 455° F.
Viscosity at 210° F _____ 65 Sec. S. U.
Solid point _____ 102° F.
Color _____ 4½ N. P. A.

This was diluted with the 1,3 dichlor, 2 methyl propane described above in the proportion of four parts of solvent to one part of oil and heated to 100° F., at which temperature it was bright.

The mixture was chilled to —10° F. and filtered through canvas to effect separation of wax. The dewaxed oil was washed with the 1,3 dichlor, 2 methyl propane chilled to —10° F., using two parts of solvent to one part of oil, the wash liquid being added to the dewaxed oil solution.

The solvent was evaporated from oil and wax and an oil was obtained having a solid point of —2° F. The yield was Oil _____ 93.5%
Wax _____ 6.5%

Dewaxing a similar fraction by the conventional method using naphtha as a diluent and centrifugal separation gave the following yields:

Oil _____ 75%
Wax _____ 25%

I claim:

1. The method of dewaxing petroleum stock which comprises selectively extracting oil from the stock by dissolving the oil content of the stock in 1,3 dichlor, 2 methyl propane and thereafter removing wax from the solution at a temperature sufficiently low to effect precipitation of wax.

2. The method of dewaxing petroleum stock which comprises selectively extracting oil from the stock by dissolving the stock in 1,3 dichlor, 2 methyl propane at a temperature sufficiently high to effect solution of both oil and wax in the solvent and thereafter chilling the solution to a temperature sufficiently low to effect precipitation of wax and removing precipitated wax from the oil solution.

3. The method of dewaxing petroleum stock which comprises selectively extracting oil from the stock by dissolving the oil content of the stock in 1,3 dichlor, 2 methyl propane and thereafter removing wax from the solution by filtration at a temperature sufficiently low to effect precipitation of wax.

4. The method of dewaxing petroleum stock which comprises selectively extracting oil from the stock by dissolving the oil content of the stock in 1,3 dichlor, 2 methyl propane and thereafter removing wax from the solution by centrifugal force at a temperature sufficiently low to effect precipitation of wax.

5. The method of dewaxing petroleum stock which comprises selectively extracting oil from the stock by dissolving the oil content of the stock in 1,3 dichlor, 2 methyl propane and thereafter removing wax from the solution by cold settling at a temperature sufficiently low to effect precipitation of wax.

6. The method of dewaxing petroleum stock which comprises selectively extracting oil from the stock by dissolving the stock in 1,3 dichlor, 2 methyl propane at a temperature sufficiently high to effect solution of both oil and wax in the solvent and thereafter chilling the solution to a temperature sufficiently low to effect precipitation of wax and removing precipitated wax from the oil solution by filtration.

7. The method of dewaxing petroleum stock which comprises selectively extracting oil from the stock by dissolving the stock in 1,3 dichlor, 2 methyl propane at a temperature sufficiently high to effect solution of both oil and wax in the solvent and thereafter chilling the solution to a temperature sufficiently low to effect precipitation of wax and removing precipitated wax from the oil solution by centrifugal force.

8. The method of dewaxing petroleum stock which comprises selectively extracting oil from the stock by dissolving the stock in 1,3 dichlor, 2 methyl propane at a temperature sufficiently high to effect solution of both oil and wax in the solvent and thereafter chilling the solution to a temperature sufficiently low to effect precipitation of wax and removing precipitated wax from the oil solution by cold settling.

9. The method of dewaxing petroleum stock which comprises selectively extracting oil from the stock by dissolving the oil content of the stock in dichlor butane having approximately the following properties:

Boiling point _____ 136° C. at 760 mm. pressure
Specific gravity _____ 1.1375 at 15.5° C., and thereafter removing wax from the solution at a temperature sufficiently low to effect precipitation of wax.

10. The method of dewaxing petroleum stock which comprises selectively extracting oil from the stock by dissolving the oil content of the stock in a solvent comprising essentially a compound having the empirical formula $C_4H_8Cl_2$ and having approximately the following properties:

Boiling point _____ 136° C. at 760 mm. pressure
Specific gravity _____ 1.1375 at 15.5° C., and thereafter removing wax from the solution at a temperature sufficiently low to effect precipitation of wax.

LEO D. JONES.